(12) United States Patent
    To

(10) Patent No.: US 9,581,982 B2
(45) Date of Patent: Feb. 28, 2017

(54) METHOD OF OPERATION OF A CONTROL DEVICE FOR AUTOMATION SYSTEMS EQUIPMENT

(75) Inventor: Karina To, Yuen Long N.T. (HK)

(73) Assignee: SOMFY SAS, Cluses (FR)

(*) Notice: Subject to any disclaimer, the term of this patent is extended or adjusted under 35 U.S.C. 154(b) by 1124 days.

(21) Appl. No.: 13/577,613

(22) PCT Filed: Feb. 9, 2011

(86) PCT No.: PCT/EP2011/051854
§ 371 (c)(1),
(2), (4) Date: Aug. 7, 2012

(87) PCT Pub. No.: WO2011/098465
PCT Pub. Date: Aug. 18, 2011

(65) Prior Publication Data
US 2012/0310386 A1    Dec. 6, 2012

(30) Foreign Application Priority Data
Feb. 9, 2010  (FR) ..................... 10 50901

(51) Int. Cl.
    *G05B 11/01*      (2006.01)
    *G05B 15/02*      (2006.01)
    *G06F 9/44*       (2006.01)
    *H04L 12/28*      (2006.01)

(52) U.S. Cl.
    CPC ............ *G05B 15/02* (2013.01); *G06F 8/38* (2013.01); *H04L 12/282* (2013.01); *G05B 2219/2642* (2013.01); *H04L 2012/2841* (2013.01)

(58) Field of Classification Search
    CPC ............ G05B 15/00; G05B 2219/2642; G05B 2219/23156; G05B 2219/23171; G05B 2219/23258; G06F 3/04817; G06F 3/0482; G06F 3/04842; G06F 3/04847; G06F 3/04812; G06F 3/0486; G06F 3/0488
    USPC .............................................. 700/83
    See application file for complete search history.

(56) References Cited

U.S. PATENT DOCUMENTS

| 5,065,347 | A | * | 11/1991 | Pajak ................ G06F 17/30126 715/776 |
| 5,086,385 | A | * | 2/1992 | Launey ................ G06F 3/04847 340/6.11 |
| 6,236,398 | B1 | * | 5/2001 | Kojima et al. ................ 345/419 |
| 6,243,707 | B1 | * | 6/2001 | Humpleman et al. |

(Continued)

FOREIGN PATENT DOCUMENTS

| JP | 8-76978 | 3/1996 |
| WO | WO 2004/070482 A | 8/2004 |
| WO | WO 2007/003185 A | 1/2007 |

*Primary Examiner* — Darrin Dunn
(74) *Attorney, Agent, or Firm* — Frommer Lawrence & Haug LLP (57) ABSTRACT

Method of operation of a control device for automation systems equipment of a building, the device comprising a display screen, assigned to the display, at a first level, of equipments icons and, at a second level, of grouping icons, a group of home automation equipment being associated with a grouping icon, and means of selection of at least one grouping icon and/or of at least one equipment icon, characterized in that an action on a control key has the standard effect of controlling the equipment associated with several selected icons of the same level as long as no icon of another level is selected.

17 Claims, 4 Drawing Sheets

(56) References Cited

U.S. PATENT DOCUMENTS

| | | | | |
|---|---|---|---|---|
| 6,724,409 B1* | 4/2004 | Maddocks | G05B 19/0426 | 715/751 |
| 6,756,998 B1* | 6/2004 | Bilger | H04L 12/2803 | 715/734 |
| 6,957,075 B1* | 10/2005 | Iverson | H04M 1/72572 | 455/419 |
| 7,047,092 B2* | 5/2006 | Wimsatt | G05B 15/02 | 345/173 |
| 7,745,743 B2* | 6/2010 | Liu | G08C 23/04 | 200/341 |
| 8,607,149 B2* | 12/2013 | Hintermeister | G06F 3/048 | 715/731 |
| 9,202,365 B2* | 12/2015 | Duchene | G08C 17/02 | |
| 2001/0030664 A1* | 10/2001 | Shulman | G06Q 30/02 | 715/835 |
| 2002/0003548 A1* | 1/2002 | Krusche | G06F 3/0481 | 715/736 |
| 2002/0013629 A1* | 1/2002 | Nixon | G05B 19/0421 | 700/4 |
| 2003/0001883 A1* | 1/2003 | Wang | G06F 3/0481 | 715/736 |
| 2003/0229900 A1* | 12/2003 | Reisman | | 725/87 |
| 2004/0117068 A1* | 6/2004 | Lee | H04L 12/2803 | 700/275 |
| 2004/0260407 A1* | 12/2004 | Wimsatt | | 700/19 |
| 2004/0268260 A1* | 12/2004 | Rockey | G06F 9/4446 | 715/708 |
| 2005/0283740 A1* | 12/2005 | Cleeves | G06Q 10/00 | 715/835 |
| 2006/0052884 A1* | 3/2006 | Staples | G05B 19/0426 | 700/83 |
| 2006/0069459 A1* | 3/2006 | Retlich | G05B 23/027 | 700/108 |
| 2006/0112354 A1* | 5/2006 | Park | G06F 3/0481 | 715/835 |
| 2007/0067062 A1* | 3/2007 | Mairs | G09B 25/04 | 700/275 |
| 2007/0283322 A1* | 12/2007 | Hsu et al. | | 717/113 |
| 2008/0141172 A1* | 6/2008 | Yamamoto | G06F 3/0482 | 715/835 |
| 2008/0270937 A1* | 10/2008 | Poulet | G05B 19/0426 | 715/810 |
| 2009/0100355 A1* | 4/2009 | Takemura | H04L 12/2803 | 715/757 |
| 2009/0195349 A1* | 8/2009 | Frader-Thompson | G01D 4/002 | 340/3.1 |
| 2010/0017739 A1* | 1/2010 | Han | H04L 67/025 | 715/772 |
| 2010/0023865 A1* | 1/2010 | Fulker | G06F 3/04817 | 715/734 |
| 2010/0039283 A1* | 2/2010 | Ratcliff | G08C 17/00 | 340/12.53 |
| 2010/0138764 A1* | 6/2010 | Hatambeiki | G08C 17/02 | 715/765 |
| 2010/0141602 A1* | 6/2010 | Duchene | G05B 19/042 | 345/173 |
| 2010/0145485 A1* | 6/2010 | Duchene | G05B 19/042 | 700/90 |
| 2010/0146423 A1* | 6/2010 | Duchene | G05B 19/042 | 715/765 |
| 2010/0217837 A1* | 8/2010 | Ansari | G06Q 30/04 | 709/218 |
| 2011/0191516 A1* | 8/2011 | Xiong et al. | | 710/305 |
| 2011/0208359 A1* | 8/2011 | Duchene | G05B 15/02 | 700/275 |
| 2011/0302517 A1* | 12/2011 | Duchene | G08C 17/02 | 715/771 |

* cited by examiner

METHOD OF OPERATION OF A CONTROL DEVICE FOR AUTOMATION SYSTEMS EQUIPMENT

This application is a 371 of PCT/EP2011/051854 filed on Feb. 9, 2011, published on Aug. 18, 2011 under publication number WO 2011/098465, which claims priority benefits from French Patent Application Number 10/50901 filed Feb. 9, 2010, the disclosure of which is incorporated herein by reference.

The invention relates to a device for controlling a residential or business automation system installation.

Such an installation comprises equipment such as electromechanical actuators notably controlling sun protection screens, or electrical loads. For the remote control of this equipment, the installation comprises at least one control point which allows control commands to be sent as individual control commands or grouped control commands to the various pieces of equipment.

It is increasingly commonplace for these control points to comprise advanced interfaces, notably having a screen and a plurality of control keys. The screens can be touch screens, allowing the user, like on a computer, to select, validate, and control using a rich graphical interface that develops in the course of the actions that are automatic or created by a user.

In particular, the patent application JP08076978 describes a touch-screen controller that can operate according to several modes. In one operational mode, only the available keys relating to this mode are displayed. The interface presented to the user therefore varies according to the current operational mode.

Furthermore, creating groups of equipment or scenarios including certain pieces of equipment of the installation is known. Thus, a single control command action allows a plurality of items of equipment to be simultaneously controlled. The configuration of these groups or scenarios must be carried out prior to the control command. Menus on the graphical interfaces simplify these configurations.

The patent EP 1 590 711 describes procedures for automatic formation of groups according to a predefined parameter, for example the type of equipment, the length of travel, etc.

The document WO 2007/003185 describes a control device for a home automation system, thanks to which individual or grouped control commands can be generated.

The document U.S. Pat. No. 6,243,707 describes a home automation system in which various pieces of equipment can be simultaneously controlled notably in order to implement a scenario.

The document U.S. Pat. No. 6,236,398 describes a selection system for home automation system devices.

The aim of the invention is to improve the existing methods, in particular in the case where the control interface is a graphical interface developing according to the actions of the user. Another aim of the invention is to simplify the selection and de-selection of the objects to be controlled, either individually or in the framework of a group.

The goal of the invention is to provide a configuration method that overcomes the drawbacks mentioned hereinabove and that improves the configuration known from the prior art. In particular, the invention allows a configuration method to be implemented that is simple, reliable, fast and intuitive.

According to the invention, the method governs the operation of a control device for automation systems equipment of a building. The device comprises a display screen, assigned to the display, at a first level, of equipment icons and, at a second level, of grouping icons, a group of automation systems equipment being associated with a grouping icon, and means of selection of at least one grouping icon and/or of at least one equipment icon. The method is characterized in that an action on a control key has the standard effect of controlling all of the equipment associated with several selected icons of the same level as long as no icon of another level is selected.

According to the invention, the method governs the operation of a control device for automation systems equipment of a building. The device comprises a display screen, assigned to the display, at a first level, of equipment icons and, at a second level, of grouping icons, a group of automation systems equipment being associated with a grouping icon, and means of selection of at least one grouping icon and/or of at least one equipment icon. The method is characterized in that an action on a control key has the standard effect of controlling all of the equipment associated with at least one grouping icon selected as long as no equipment icon of this group is selected.

The action on the control key can have the effect of controlling all of the equipment associated with a selected grouping icon as long as no icon for a piece of equipment of this group is also selected.

The action on the control key can have the effect of controlling all of the equipment associated with several selected grouping icons.

The action on the control key can have the effect of sending a command to all of the equipment associated with several equipment icons selected.

The method of operation can comprise a step for displaying icons at the first and at the second level simultaneously.

The control key can be a virtual key displayed in a part of the screen when a grouping icon is selected.

The virtual control key can be a generic multi-applications key when all the equipment being controlled comprises items of equipment of different types.

The virtual control key can be a key dedicated to the type of equipment being controlled when all the equipment of the group being controlled are of the same type.

The virtual control key can be a key dedicated to the type of equipment being controlled when an individual item of equipment is selected.

Preferably, no virtual control key is displayed when no equipment or grouping icon is selected.

The grouping icons can be localization icons, grouping equipment according to their localization inside the building or its surroundings, or type icons grouping equipment comprising the same type of actuator and/or the same type of associated product.

According to the invention, the control device for equipment of a home automation system installation comprises an interface for the display and the input of information relating to the control of the equipment of the installation, the interface comprising a means of display, at a first level, of equipment icons and, at a second level, of grouping icons, a group of home automation equipment being associated with a grouping icon, and means of selection of at least one grouping icon and/or of at least one equipment icon. The device comprises means for processing the information displayed and the information input. It furthermore comprises standard means for controlling a group of equipment linked according to a common criterion.

The standard control means can be replaced by individual control means when a single piece of equipment is specified at the level of the interface.

The control means can be virtual means not associated with physical keys of the device.

The device can comprise a touch screen for the display and the input of information and commands.

The control device preferably comprises hardware and/or software means for implementing the control method previously defined. These means can comprise software means.

The invention also relates to a computer program comprising a means for coding a computer program designed for the implementation of the steps of the control method previously defined, when the program is executed on a computer.

Figure 1:
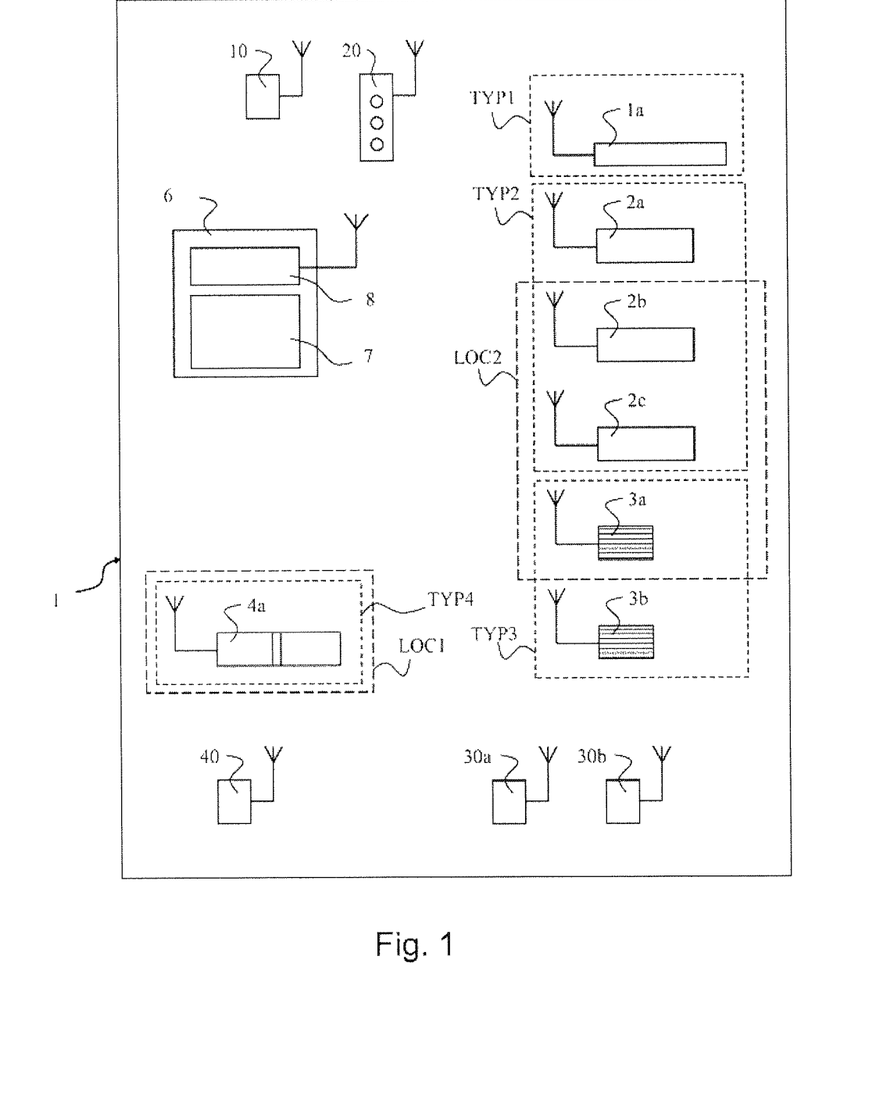
FIG. 1 shows a home automation system installation comprising several items of equipment of four different types.

The invention will be better understood upon reading the description that follows, presented solely by way of example and with reference to the appended drawings in which:

FIG. 1 shows a home automation system installation 1 comprising several items of equipment of four different types.

The equipment comprises actuators and home automation products on which the actuators act to move them or to activate them. The actuators comprise means for receiving commands via a radio channel, represented by an antenna. Alternatively, the commands can be transmitted via other wired or wireless means of communication, such as power carrier or infrared rays.

A piece of equipment of a first type TYP1 is for example a motorized blind 1a, controlled by a first control element 10. Equipment of a second type TYP2 is for example a set of motorized roller blinds 2a, 2b, 2c, that can be controlled by means of a second control element 20. Equipment of a third type TYP3 is for example a set of motorized venetian blinds 3a and 3b. They can be respectively controlled by third control means 30a and 30b. A unit of equipment of a fourth type TYP4 is for example a motorized gate 4a, driven by means of a fourth control element 40. A dashed line frame surrounds the equipment of the same type.

Other types of equipment can be present in such an installation but these are not shown, including by way of examples actuators for garage doors, alarms, locking systems, natural ventilation, lighting, heating-air conditioning, etc.

The installation 1 also comprises a control device 6 or controller taking for example the form of a fixed control panel, notably mural. The controller comprises a control screen 7, preferably of the touch-sensitive type, and an electronic unit 8 providing the management of the controller, in particular the management of the screen. The controller also comprises other man-machine interface means such as a control command keyboard, indicator lamps and processing means for the control of the equipment and the radio communication.

FIG. 1 represents groupings of equipment based on their localization (real localization or such as imagined or such as desired by the user) inside of the building or its surroundings.

A first localization LOC1, corresponding to the garden, incorporates the motorized gate 4a. A second localization LOC2 groups two of the motorized roller blinds 2b and 2c and one of the motorized venetian blinds 3a, installed in the living room. Other groupings have been arranged by the user, which have not been included in FIG. 1 so as not to overload it. For example, the localization LOC3 corresponds to a first bedroom 1, whereas the localization LOC4 corresponds to a second bedroom.

Figure 2:
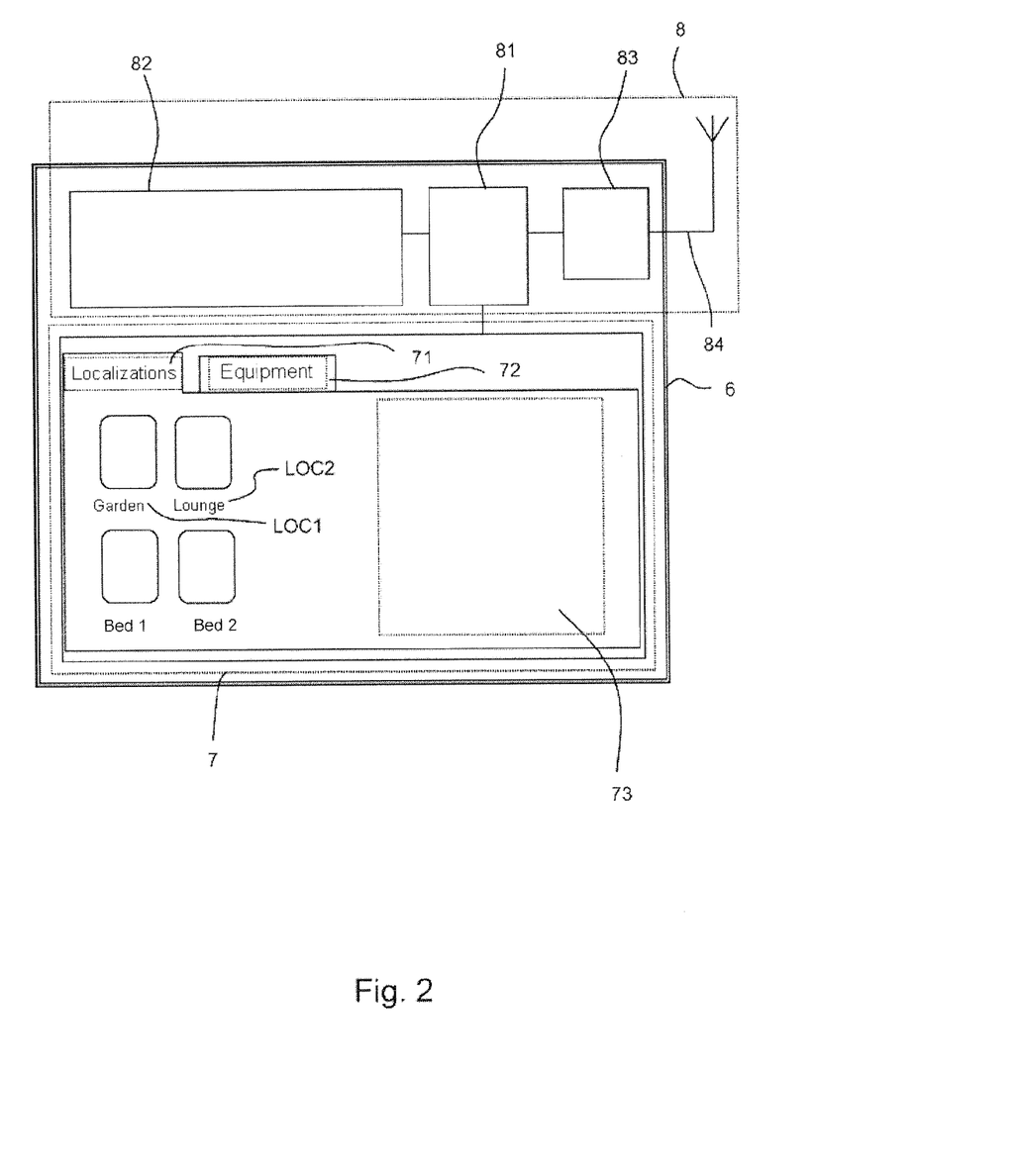
FIG. 2 shows schematically the control device according to the invention.

The controller 6 is detailed in FIG. 2. The electronic unit 8 comprises a microcontroller 81 connected, on the one hand, to a user interface 82 comprising for example a control command keyboard, on the other hand, to a transmitter-receiver 83 for control commands in the form of electromagnetic waves comprising an associated antenna 84. The controller notably allows the various equipment units in the building to be controlled, individually or in a predefined group.

The equipment and the control device communicate with each other by using the same radiofrequency protocol. An antenna symbol represents this common means of communication. Alternatively, several protocols may be used, with communication gateways or with devices supporting several protocols.

In order to communicate with the various electrical equipment in the house mentioned hereinabove, the controller is initially connected to or matched with this equipment, in other words an identifier is exchanged in order to allow a communications link to be created between the controller and the equipment and to recognize where the information sent is to be addressed whether the latter be control commands or any other type of message.

The groupings by localization or by type are represented on the screen of the control device by icons called grouping icons. Thus, each localization, in other words a group of equipment located in same place, is represented by a localization icon ILOCi. An alphanumeric text indicates the meaning of the icon, for example "Lounge" for the second localization icon. As will be seen hereinbelow, the user is free to choose, in a database of localization icons, those of his choice, and to give it the name of his choice. He is also free to associate various equipment units with each localization.

A generic icon or icon of the type ITYPi, represents a group of equipment comprising the same type of actuator and/or the same type of associated product. It is symbolized preferably by a schematic graphical representation of a type of product that may be activated by the actuator. For example, in the case of a mobile screen that can be moved by the actuator, the icon is a graphical representation of the screen in a position intermediate between two end positions, notably an average position.

Thus, there is a first icon of the type ITYP1 for representing the groupings of equipment of the same type, such as previously described. Preferably, the icon represents schematically the type of equipment to which it corresponds, for example a half-deployed patio awning for the second type.

Similarly, for each item of equipment, an equipment icon is provided such that it symbolizes a particular piece of equipment of the building to be controlled. In order to simplify the graphics diagrams, the symbols associated with the various icons are not shown in the figures.

Preferably, the grouping icons (localization and type) are themselves separated on the screen under two tabs 71, 72. The localization icons are grouped under a tab "Localizations" 71 on the screen of the controller. When this tab is active, the various icons of the pre-recorded localizations are displayed. FIG. 2 more particularly shows this tab and the display of the localization icons in an information area, referred to as a second level area.

A second tab "Equipment" allows the various type icons for equipment available in the installation to be displayed. Any graphical representation other than tabs is clearly possible without changing the spirit of the invention, where the various grouping can be displayed in the same area of the screen.

The grouping icons and the equipment icons correspond to different display levels, in particular given that the individual items of equipment can be associated with given groupings.

One portion of screen 73, referred to as control area, allows control keys to be displayed that are associated with the selected object or objects.

This control area can be empty when none of the icons is selected. The selection of an icon may be effected by action on the screen when the latter is of the touch-sensitive type, or by the use of a pointer (mouse, pen, etc.).

Figure 3:
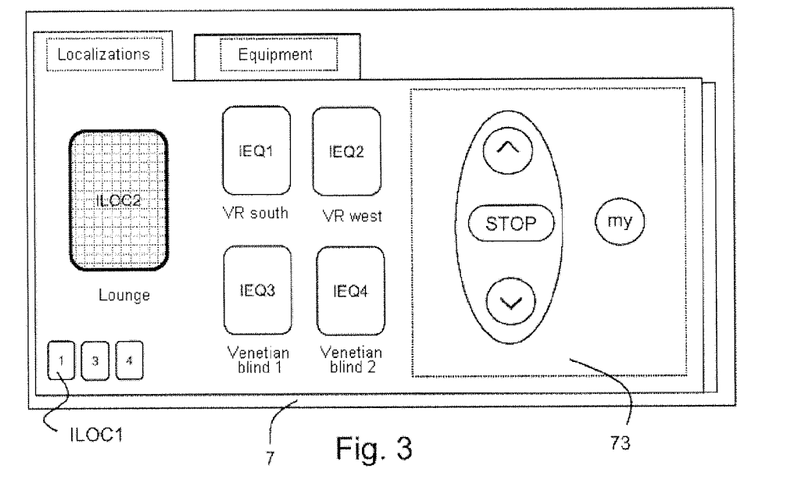
FIGS. 3 to 6 are schematic representations of displays on a screen of a man-machine interface of the control device showing various steps of the method of operation according to the invention.

When a grouping icon is selected, the various equipment icons corresponding to this grouping are displayed inside of each tab, within an information area, referred to as a first level area. Preferably, the grouping icon selected is also shown. This display is shown in FIG. 3, representing the screen, and the localization icon ILOC2 corresponding to the lounge appears in bold, in order to indicate that it is the active icon. The equipment icons could also be displayed in another display window or in a tab other than that of the first level of information. The simultaneous display, in separate areas of the screen, of the icons of different display levels allows however the content of the groupings to be known.

In addition, when a user selects a grouping icon, control icons are displayed in the control area. The latter correspond to virtual keys, for example for the opening, the closing, the stopping, and the command to go to a customized value. According to the invention, as long as no equipment icon has been selected, these control icons correspond by default to all of the equipment belonging to the chosen grouping.

If the chosen grouping is a grouping by type of equipment, the control icons can be designed for this type of equipment.

If the grouping is a grouping by localization, then the virtual keys correspond to a basic "multi-applications" control, given that the equipment corresponding to the selected localization can be of various types. When the group control command must be addressed to items of equipment of various types, the virtual control keys could by default also be limited to only the keys common to all of the equipment. In which case, if the pieces of equipment to be controlled do not have any common control key, none is displayed and the group control function is not available. Alternatively, if the items of equipment associated with a localization are all of the same type, the virtual keys can be dedicated to this type of equipment. In the case where all the equipment participating in a scenario belong to all of the equipment represented by the localization icon, a control icon for this scenario can appear in the control area 73 and the scenario can be played following an action on this icon located in the control area. The scenario control icon is added to or replaces the control key or keys.

In the configuration shown in FIG. 3, the display in the control area therefore corresponds to a control for a whole group (where the latter may contain somewhat disparate units of equipment), the group being defined by the group of equipment assigned to the chosen localization. Each of the various units of equipment of the group has a link established by a prior configuration with the localization. If a user wishes to control individually one of the pieces of equipment of this localization, he selects the corresponding icon, for example the icon IEQ4 corresponding to a venetian blind with orientable slats. At this time, the grouping icon ILOC2 and the equipment icon IEQ4 are both selected, although they correspond to two different levels of display. Alternatively, the selection of one cancels the selection of the other.

Figure 4:
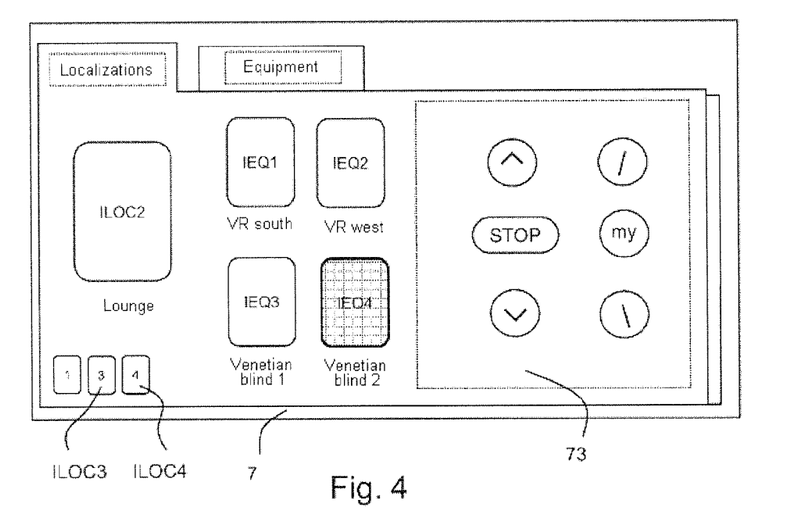

The equipment icon is now shown in bold in FIG. 4. The control area then comprises (in this example, being added to the control icons seen previously), new icons allowing control dedicated to the orientation of the slats of the blind. The control icons that have remained identical still allow the opening, the closing, the stopping, and the control to go to a customized value to be controlled, but this time they only address the selected equipment and no longer the previous group.

Alternatively, the control keys form a part of the user interface 82. This can incorporate a certain number of keys allowing all of the functions associated with the equipment of the installation to be controlled. However, depending on the icon selected, the actions associated with pushing on the control keys vary. By default, the control keys allow all of the equipment associated with a grouping icon to be controlled, as long as an equipment icon has not been selected. As soon as an equipment icon is selected, the operation of the control keys switches and allows the individual control of the equipment selected. The group control is cancelled.

Figure 5:
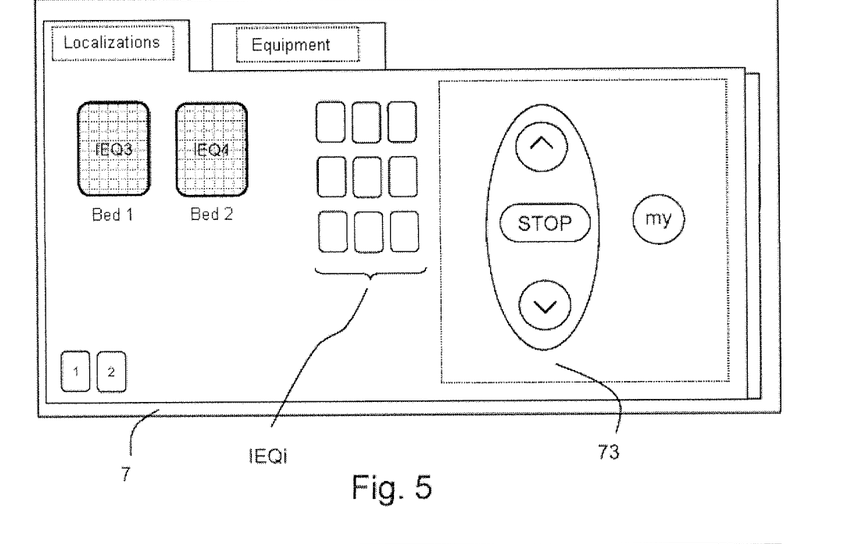
Figure 6:
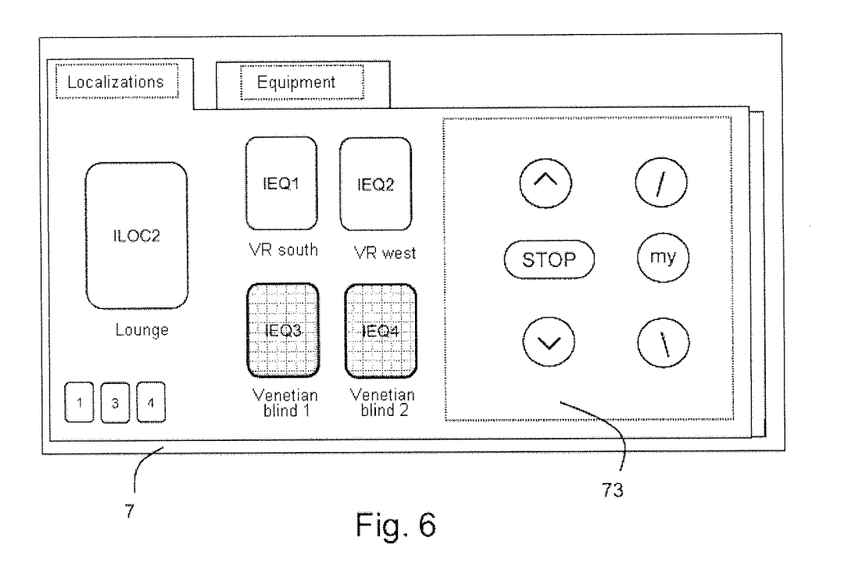

According to another aspect of the invention, shown in FIGS. 5 and 6, it is possible to select more than one icon of the same level as long as an icon of another display level has not been selected. In particular, the invention allows a user to select several equipment icons within a grouping. The control keys then relate to the equipment whose icons are selected. A sub-group is therefore formed temporarily without prior or later recording. This sub-group disappears at the moment when at least one icon of another level is selected. This alternative allows the de-selection of icons to be easily managed, in particular, from one level of display to another. Thus, several icons of the same display level can be selected together, but the selection of an icon from another level cancels the previous selection. Preferably, a new selection of an icon already selected cancels its selection. These measures allow the management of the groups or of the individual equipment to be controlled to be simplified.

A third level of display can correspond to the various tabs or to any equivalent type of indexation. Thus, the selection of a tab cancels a previous selection of one or several equipment or grouping icons.

The control of all of the equipment associated with a localization icon as a group is not necessarily an obvious step, in particular when the units of equipment are of different types. It represents however an improvement in that it offers the user an additional control function. The way the groupings are formed could also be thought in this perspective of standard group control.

A third tab can be assigned to the control by scenario. A pre-recorded and activated scenario allows the various items of equipment participating in this scenario to be positioned in the pre-recorded positions or states. Thus, in this third tab, scenario icons are displayed, for which it is not necessary to display control keys given that the latter are included in the scenario. The scenarios may also be associated with localizations or types of equipment.

In one variant of the invention, scenario icons associated with this grouping icon could replace the virtual control keys corresponding to the grouping icon selected or be added to the latter. The standard control is therefore a control constructed by the user when he defines a scenario. The control is therefore applicable to the equipment of the group associated with the selected grouping icon and participating in the control scenario selected.

Alternatively, all the scenario icons (associated or not associated with a grouping icon) are displayed in the control area. Their selection allows the pre-recorded scenario to be played, but in a limited way: only the equipment participating in the scenario and associated with the selected grouping icon are concerned by the control.

A fourth tab can correspond to the display of all the equipment icons outside of their links with a grouping icon. A control area can also allow the standard control of all the equipment in the tab when no individual equipment icon is selected.

In the description hereinabove, an equipment icon can also be associated with a group of equipment predefined by configuration of the installation. The method of operation remains identical, the group standard control being applicable to the individual or grouped equipment.

The invention claimed is:

1. A method of operation of a control device for automation systems equipment of a building, the device comprising a display screen, assigned to the display, at a first level, of equipment icons and, at a second level, of grouping icons, a group of automation systems equipment being associated with a grouping icon, and means of selection of at least one of (a) at least one grouping icon and (b) at least one equipment icon, wherein an action on a control key for a selected icon has an effect of controlling all of the equipment associated with several icons selected of a same level as long as no icon of another level is selected, wherein the control key is a virtual key displayed in a part of the screen when a grouping icon is selected, and wherein the virtual control key is (a) a generic multi-applications key when all the equipment being controlled comprises items of equipment of different types (b) a key dedicated to the type of equipment being controlled when all the equipment of the group being controlled are of a same type and (c) a key dedicated to the type of equipment being controlled when an individual piece of equipment is selected.

2. The method of operation as claimed in claim 1, wherein the method comprises a step for displaying icons at the first and at the second level simultaneously.

3. The method of operation as claimed in claim 1, wherein no virtual control key is displayed when no equipment or grouping icon is selected.

4. The method of operation as claimed in claim 1, wherein the grouping icons are localization icons, grouping equipment according to their localization inside the building or its surroundings or type of icons, grouping equipment comprising a same type of actuator and a same type of associated product or grouping equipment comprising the same type of actuator or the same type of associated product.

5. A non-transitory computer readable medium storing a program adapted to perform, on a computer, the steps of the control method as claimed in claim 1.

6. The method of operation as claimed in claim 1, wherein the action on the control key has an effect of controlling at least one of (a) all of the equipment associated with a selected grouping icon as long as no equipment icon of this group is also selected, (b) all of the equipment associated with several selected grouping icons and (c) all of the equipment associated with several selected equipment icons.

7. A method of operation of a control device for automation systems equipment of a building, the device comprising a display screen, assigned to the display, at a first level, of equipment icons and, at a second level, of grouping icons, a group of automation systems equipment being associated with a grouping icon, and means of selection of at least one of (a) at least one grouping icon and (b) at least one equipment icon, wherein an action on a control key for a selected icon has an effect of controlling all of the equipment associated with at least one grouping icon selected as long as no equipment icon of this group is selected, wherein the action on the control key has an effect of controlling (a) all of the equipment associated with a selected grouping icon as long as no equipment icon of this group is also selected (b) all of the equipment associated with several selected grouping icons and (c) all of the equipment associated with several selected equipment icons.

8. The method of operation as claimed in claim 7, wherein the method comprises a step for displaying icons at the first and at the second level simultaneously.

9. The method of operation as claimed in claim 7, wherein the control key is a virtual key displayed in a part of the screen when a grouping icon is selected.

10. The method of operation as claimed in claim 9, wherein the virtual control key is at least one of (a) a generic multi-applications key when all the equipment being controlled comprises items of equipment of different types, (b) a key dedicated to the type of equipment being controlled when all the equipment of the group being controlled are of the same type and (c) a key dedicated to the type of equipment being controlled when an individual piece of equipment is selected.

11. The method of operation as claimed in claim 9, wherein no virtual control key is displayed when no equipment or grouping icon is selected.

12. The method of operation as claimed in claim 10, wherein no virtual control key is displayed when no equipment or grouping icon is selected.

13. The method of operation as claimed in claim 7, wherein the grouping icons are localization icons, grouping equipment according to their localization inside the building or its surroundings or type of icons, grouping equipment comprising a same type of actuator and a same type of associated product or grouping equipment comprising the same type of actuator or the same type of associated product.

14. A non-transitory computer readable medium storing a program adapted to perform, on a computer, the steps of the control method as claimed in claim 7.

15. A control device for equipment of an automation system installation, comprising an interface for the display and the input of information relating to the control of the equipment of the installation, the interface comprising a means of display, at a first level, of equipment icons and, at a second level, of grouping icons, a group of automation systems equipment being associated with a grouping icon, and means of selection of at least one of (a) at least one grouping icon and (b) at least one equipment icon, the control device comprising means for processing information displayed and information input, wherein the device comprises virtual means not associated with physical keys of the device for a selected icon for controlling a group of equipment linked according to a common criterion, wherein the control key is a virtual key displayed in a part of the screen when a grouping icon is selected, and wherein the virtual control key is (a) a generic multi-applications key when all the equipment being controlled comprises items of equipment of different types (b) a key dedicated to the type of equipment being controlled when all the equipment of the group being controlled are of a same type and (c) a key dedicated to the type of equipment being controlled when an individual piece of equipment is selected.

16. The control device as claimed in claim 15, wherein the standard control means are replaced by individual control means when a single piece of equipment is specified at the first level of the interface.

17. The control device as claimed in claim 15, wherein the device comprises a touch screen for the display and the input of information and controls.

* * * * *